(12) United States Patent
Sheehan

(10) Patent No.: US 7,778,992 B2
(45) Date of Patent: Aug. 17, 2010

(54) COMPUTING RESOURCE SELECTION METHOD AND SYSTEM

(75) Inventor: Alexander Brantley Sheehan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/023,419

(22) Filed: Jan. 31, 2008

(65) Prior Publication Data

US 2009/0198721 A1 Aug. 6, 2009

(51) Int. Cl.
*G06F 7/00* (2006.01)
(52) U.S. Cl. ..................................... 707/705
(58) Field of Classification Search .............. 707/3
See application file for complete search history.

(56) References Cited

U.S. PATENT DOCUMENTS

| | | | |
|---|---|---|---|
| 6,449,643 B1 | 9/2002 | Hyndman et al. | |
| 2006/0165060 A1* | 7/2006 | Dua ........................... | 370/352 |
| 2006/0265377 A1* | 11/2006 | Raman et al. ................ | 707/9 |
| 2006/0294077 A1* | 12/2006 | Bluhm et al. ................ | 707/3 |
| 2007/0214497 A1 | 9/2007 | Montgomery et al. | |

* cited by examiner

*Primary Examiner*—Charles Rones
*Assistant Examiner*—Fazlul Quader
(74) *Attorney, Agent, or Firm*—Schmeiser, Olsen & Watts; John R. Pivnichny

(57) ABSTRACT

A selection method and system. The method includes enabling, by a computing system for a requester, access to the computing system. The computing system comprises a memory system. The memory system comprises group based access control data and computing resource data organized based on an XML schema that comprises a recursive format used to support a plurality of branch levels in a resource tree. The computing system associates first group data of the group based access control data with the requester. The computing system receives from the requester, a first request for accessing the computing resource data. The computing system associates the first group data with a first group of computing resources of the computing resource data. The computing system generates a first list comprising attribute values for the first group of computing resources. The computing system stores the first list.

20 Claims, 6 Drawing Sheets

```
="http://patents.lex.company.com/pipresourcetree" xmlns:xsi="http://www.w3.org/2001/XMLSchema-instance">

Groups="Operator"/>
+0" Groups="Admin,Manager,Operator"/> to fax recipient" Groups="Operator"></ResourceTreeItem>
 application" Groups="Operator"></ResourceTreeItem> this document to other BlueTooth device" Groups="Admin"></ResourceTreeItem>

"><ResourceTreeItem>
, Operator"></ResourceTreeItem>
```

FIG. 2B

| FIG. 2A | FIG. 2B |

FIG. 2

COMPUTING RESOURCE SELECTION METHOD AND SYSTEM

FIELD OF THE INVENTION

The present invention relates to a method and associated system for selecting computing resource data.

BACKGROUND OF THE INVENTION

Selecting specified data within a system typically comprises an inaccurate process with little flexibility. Accordingly, there exists a need in the art to overcome at least some of the deficiencies and limitations described herein above.

SUMMARY OF THE INVENTION

The present invention provides a selection method comprising:

enabling, by a computing system for a requester, access to said computing system, wherein said computing system comprises a memory system, wherein said memory system comprises group based access control data and computing resource data, wherein said group based access control data and said computing resource data are organized based on an extensible markup language (XML) schema, and wherein said XML schema comprises a recursive format used to support a plurality of branch levels in a resource tree;

associating, by said computing system in response to said enabling, first group data of said group based access control data with said requestor;

receiving, by said computing system from said requestor, a first request for accessing said computing resource data;

associating, by said computing system in response to said first request, said first group data with a first group of computing resources of said computing resource data;

generating, by said computing system, a first list comprising attribute values for said first group of computing resources, wherein said attribute values are associated with an XML string that conforms to said XML schema; and presenting, by said computing system to said requester, said first list.

The present invention provides a computing system comprising a processor coupled to a computer-readable memory unit, said memory unit comprising instructions that when executed by the processor implements a selection method, said method comprising:

enabling, by said computing system for a requestor, access to said computing system, wherein said memory unit comprises group based access control data and computing resource data, wherein said group based access control data and said computing resource data are organized based on an extensible markup language (XML) schema, and wherein said XML schema comprises a recursive format used to support a plurality of branch levels in a resource tree;

associating, by said computing system in response to said enabling, first group data of said group based access control data with said requester;

receiving, by said computing system from said requestor, a first request for accessing said computing resource data;

associating, by said computing system in response to said first request, said first group data with a first group of computing resources of said computing resource data;

generating, by said computing system, a first list comprising attribute values for said first group of computing resources, wherein said attribute values are associated with an XML string that conforms to said XML schema; and presenting, by said computing system to said requester, said first list.

The present invention provides a computer program product, comprising a computer readable medium comprising a computer readable program code embodied therein, said computer readable program code adapted to implement a selection method within a computing system comprising a computer-readable memory unit, said method comprising:

enabling, by said computing system for a requester, access to said computing system, wherein said memory unit comprises group based access control data and computing resource data, wherein said group based access control data and said computing resource data are organized based on an extensible markup language (XML) schema, and wherein said XML schema comprises a recursive format used to support a plurality of branch levels in a resource tree;

associating, by said computing system in response to said enabling, first group data of said group based access control data with said requestor;

receiving, by said computing system from said requester, a first request for accessing said computing resource data;

associating, by said computing system in response to said first request, said first group data with a first group of computing resources of said computing resource data;

generating, by said computing system, a first list comprising attribute values for said first group of computing resources, wherein said attribute values are associated with an XML string that conforms to said XML schema; and presenting, by said computing system to said requester, said first list.

The present invention provides a process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing a selection method, said method comprising:

enabling, by said computing system for a requester, access to said computing system, wherein said memory unit comprises group based access control data and computing resource data, wherein said group based access control data and said computing resource data are organized based on an extensible markup language (XML) schema, and wherein said XML schema comprises a recursive format used to support a plurality of branch levels in a resource tree;

associating, by said computing system in response to said enabling, first group data of said group based access control data with said requestor;

receiving, by said computing system from said requester, a first request for accessing said computing resource data;

associating, by said computing system in response to said first request, said first group data with a first group of computing resources of said computing resource data;

generating, by said computing system, a first list comprising attribute values for said first group of computing resources, wherein said attribute values are associated with an XML string that conforms to said XML schema; and presenting, by said computing system to said requester, said first list.

The present invention advantageously provides a simple method and associated system capable of selecting specified data within a system.

BRIEF DESCRIPTION OF THE DRAWINGS

FIGS. 2A and 2B illustrate a component diagram illustrating a usage process for implementing the system of FIG. 1, in accordance with embodiments of the present invention.

DETAILED DESCRIPTION OF THE INVENTION

Figure 1:
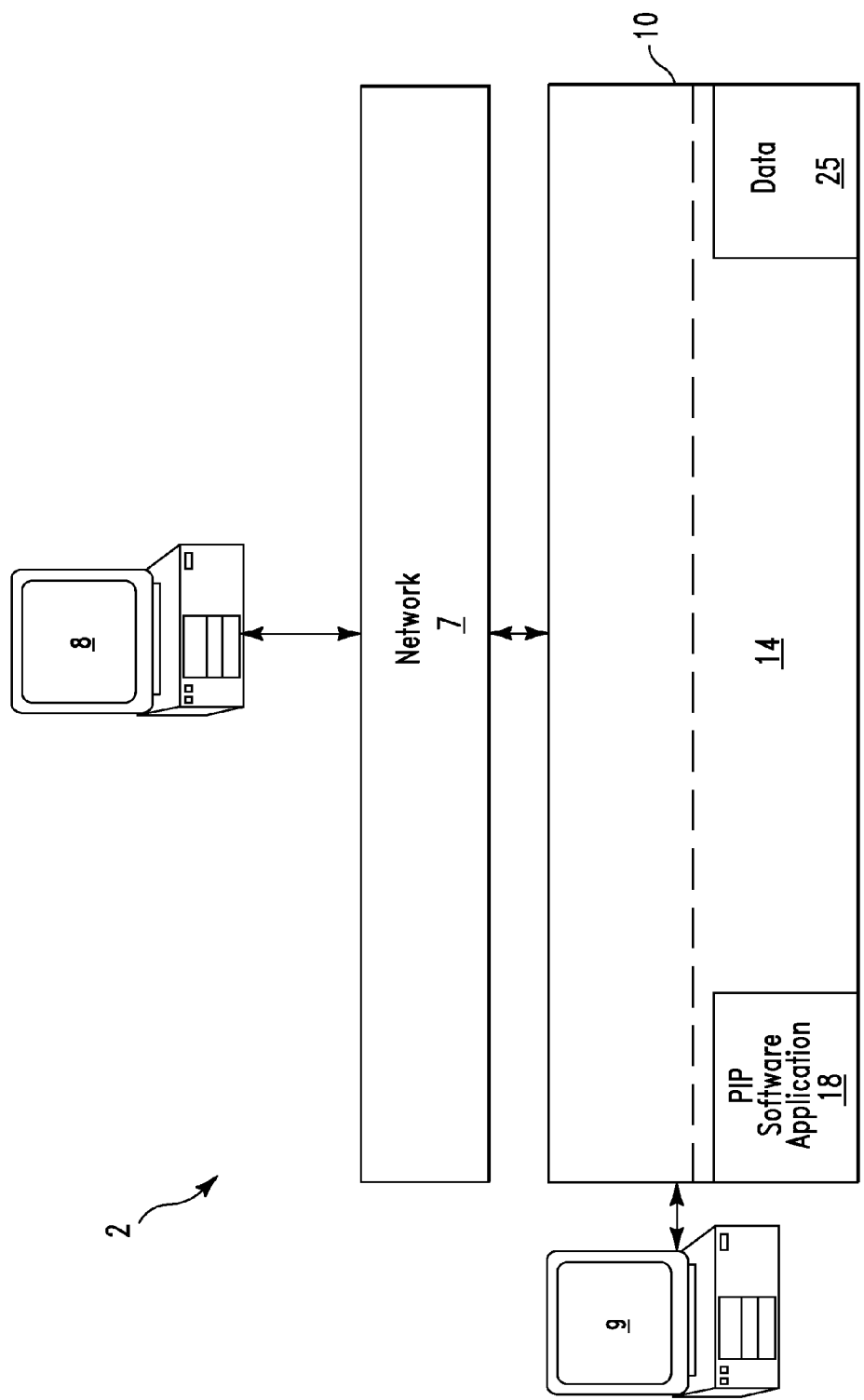
FIG. 1 illustrates a system for performing a process for selecting accessible computing resource data, in accordance with embodiments of the present invention.

FIG. 1 illustrates a system 2 for performing a process for selecting accessible computing resource data, in accordance with embodiments of the present invention. System 2 provides an efficient means to handle policy attribute data using a unique extensible markup language (XML) schema. A schema is defined herein as a model for describing the structure of information.

System 2 of FIG. 1 comprises an access terminal 8 connected to a computing system 10 through a network 7. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14 (e.g., a database). Memory system 14 may comprise a single memory system (e.g., a single database). Alternatively, memory system 14 may comprise a plurality of memory systems (e.g., multiple databases). Memory system 14 comprises a policy information point (PIP) software application 18 and data 25. Access terminal 8 is used by a user for accessing PIP software application 18 and data 25. System 2 may comprise an optional access terminal 9 connected to computing system 10. Optional access terminal 9 may be used to access PIP software application 18 and data 25. PIP software application 18 comprises a software system from which policy attribute data may be retrieved. PIP software application 18 may be leveraged directly by additional software applications (e.g., see the sample PIP ResourceTree application as described, infra). Alternatively, PIP software application 18 may be used as a plug-in component to a larger software security system (e.g., an XACML policy authorization software system). System 2 performs an access control method comprising the following steps: 1. Computing system 10 enables access for a user.

2. Computing system 10 associates first group data of group based access control data (i.e., data associated with a group to which the user belongs) with the user.

3. The computing system receives (i.e., from the user) a first request for accessing computing resource data (i.e., from data 25). Computing resource data may comprise, inter alia, application menu items, etc.

4. The computing system associates (i.e., in response to the first request) the first group data with a first group of computing resources of the computing resource data.

5. The computing system generates a first list comprising attribute values for the first group of computing resources.

6. The computing system stores the first list.

Figure 2A:
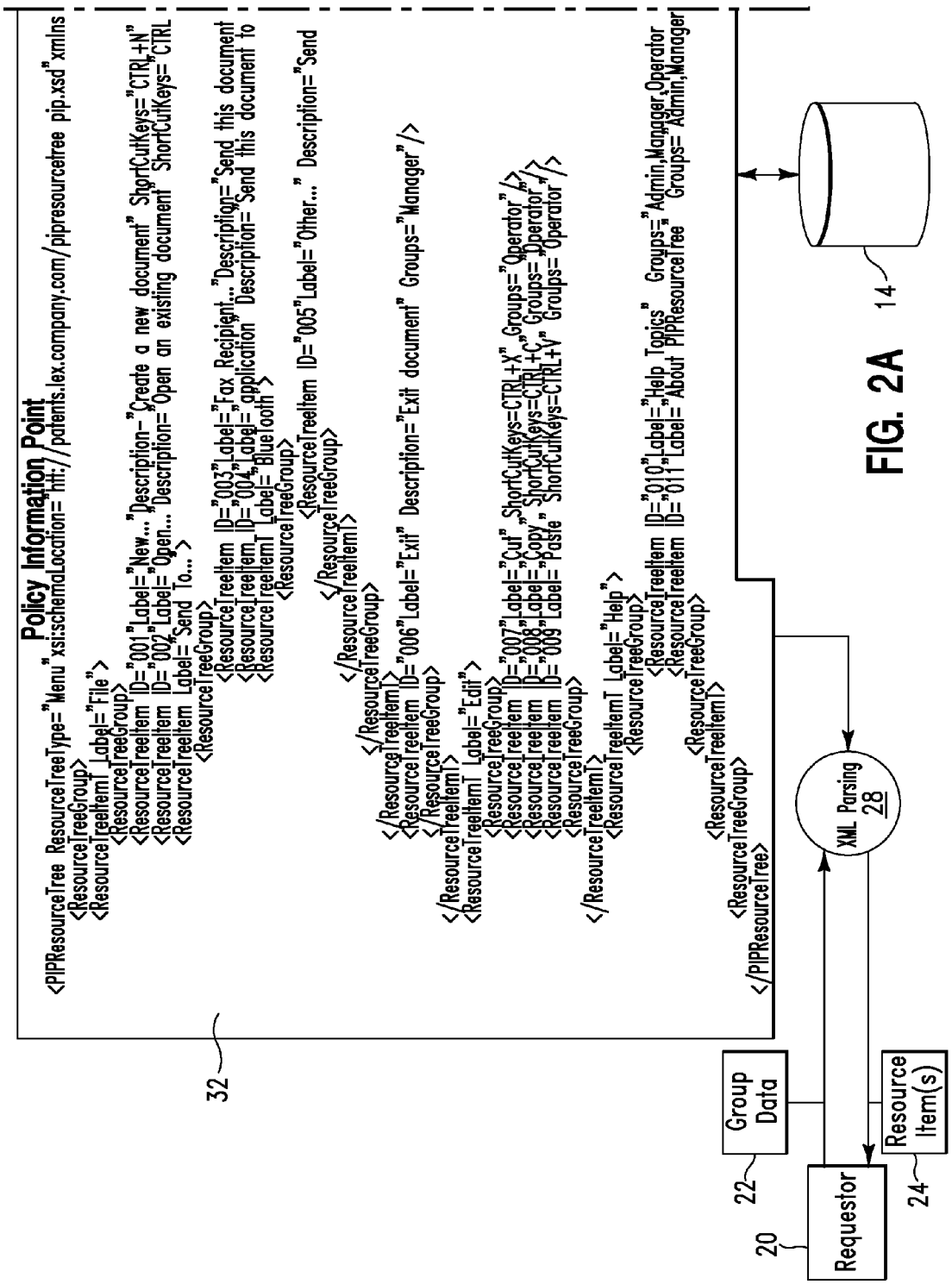

FIGS. 2A and 2B illustrate a component diagram illustrating a usage process for implementing system 2 of FIG. 1, in accordance with embodiments of the present invention. The component diagram of FIGS. 2A and 2B illustrate a scenario associated with a requestor 20 that transmits group data 22 to computing system 10. Computing system 10 scans XML data 32, which was loaded from memory system 14 in order to match groups in its XML parsing logic 28. A set of resource items 24 (i.e., attribute(s) of matched XML elements) are returned back to requestor 20. The aforementioned process comprises an instance of XML data 32 which conforms to an XML schema 34 (i.e., as described with reference to FIG. 3, infra) and XML parsing logic 28 that takes group data 22 and XML data 32 as an input and returns a set of resource items 24. Memory system 14 may comprise any type of storage mechanism capable of storing and retrieving XML character strings. XML data 32 is retrieved from memory system 14 for processing. XML data 32 comprises matching pairs of tags called an element or a node. The different nodes in FIG. 2 are labeled: PIPResourceTree, ResourceTreeGroup, ResourceTreeItemT, and ResourceTreeItem (i.e., tag names as described with reference to FIG. 3, infra). XML data 32 conforms to XML schema 34 (i.e., as described with reference to FIG. 3, infra). Each element within XML data 32 must be defined in XML schema 34. Within XML data 32, protected resources are organized in a hierarchical manner with associated group-based access control data and optional attributes, such as, inter alia, resource item description and/or shortcut keys.

The following XML code illustrates an XML sample corresponding to a PIP ResourceTree application.

```
<?xml version="1.0" encoding="UTF-8"?>
<PIPResourceTree ResourceTreeType="Menu"
xsi:schemaLocation="http://patents.lex.company.com/pipresourcetree pip.xsd"
xmlns="http://patents.lex.company.com/pipresourcetree"
xmlns:xsi="http://www.w3.org/2001/XMLSchema-instance">
    <ResourceTreeGroup>
       <ResourceTreeItemT Label="File">
          <ResourceTreeGroup>
             <ResourceTreeItem ID="001" Label="New..." Description="Create a new
document" ShortCutKeys="CTRL+N" Groups="Operator"/>
             <ResourceTreeItem ID="002" Label="Open..." Description="Open an existing
```

-continued

```
document" ShortCutKeys="CTRL+O" Groups="Admin, Manager, Operator"/>
      <ResourceTreeItemT Label="Send To...">
          <ResourceTreeGroup>
              <ResourceTreeItem ID="003" Label="Fax Recipient..."
Description="Send this document to fax recipient" Groups="Operator"></ResourceTreeItem>
              <ResourceTreeItem ID="004" Label="Application"
Description="Send this document to Application" Groups="Operator"></ResourceTreeItem>
              <ResourceTreeItemT Label="BlueTooth">
                  <ResourceTreeGroup>
                      <ResourceTreeItem ID="005" Label="Other..."
Description="Send this document to other BlueTooth device"
Groups="Admin"></ResourceTreeItem>
                  </ResourceTreeGroup>
              </ResourceTreeItemT>
          </ResourceTreeGroup>
      </ResourceTreeItemT>
      <ResourceTreeItem ID="006" Label="Exit" Description="Exit document"
Groups="Manager"/>
      </ResourceTreeGroup>
  </ResourceTreeItemT>
  <ResourceTreeItemT Label="Edit">
      <ResourceTreeGroup>
          <ResourceTreeItem ID="007" Label="Cut" ShortCutKeys="CTRL+X"
Groups="Operator"/>
          <ResourceTreeItem ID="008" Label="Copy" ShortCutKeys="CTRL+C"
Groups="Operator"/>
          <ResourceTreeItem ID="009" Label="Paste" ShortCutKeys="CTRL+V"
Groups="Operator"/>
      </ResourceTreeGroup>
  </ResourceTreeItemT>
  <ResourceTreeItemT Label="Help">
      <ResourceTreeGroup>
          <ResourceTreeItem ID="010" Label="Help Topics"
Groups="Admin, Manager, Operator"></ResourceTreeItem>
          <ResourceTreeItem ID="011" Label="About PIPResourceTree"
Groups="Admin, Manager, Operator"></ResourceTreeItem>
      </ResourceTreeGroup>
  </ResourceTreeItemT>
  </ResourceTreeGroup>
</PIPResourceTree>
```

XML parsing logic 28 comprises logic that is applied to XML data 32. When XML data 32 conforms to XML schema 34 and group data 22 is supplied, XML parsing logic 28 renders appropriate resource items 24. XML parsing logic 28 scans XML data 32 for attributes that match the input group data 22. When a match is found, XML parsing logic 28 may return any number of attributes for ResourceTreeItem. In FIG. 2, label, description and ShortCutKeys attributes are returned. The matching label and ShortCutKeys attributes are displayed in the menu for the user. The description attribute is used by the PIP ResourceTree application to display the bubble help. For example, the bubble help text for the File|Send To|BlueTooth|Other . . . menu item is "Send this document to other BlueTooth device".

Requestor 20 directly calls computing system 10. Requestor 20 supplies group data 22 and retrieves resource items 24. Requestor 20 may comprise a computing process which is a part of a larger system. As a first example, in a policy oriented authorization system, requestor 20 would be a context handler which would call computing system 10 to obtain policy attribute data (i.e., resource items 24 which would subsequently be fed to the policy decision point which would use that data to evaluate authorization policies). As a second example, requester 20 could be a web application which displays information on web pages based upon the groups to which the active user belongs.

System 2 performs a group-oriented process. XML data 32 uses group data 22 to determine which resource items to return to requester 20. One of the mandatory attributes of a ResourceTreeItem is Groups. The Groups attribute consists of a list of groups which are permitted to access this particular ResourceTreeItem. Requestor 20 must supply group data 22, which comprises an input to XML parsing logic 28.

Resource items 24 that are returned by XML parsing logic 28 comprise the attribute data for the ResourceTreeItem nodes whose groups attribute data match group data 22. Various transformations may be applied in XML parsing logic 28 to produce various outputs. The output could be a comma delimited list of IDs. The output could be in the form of an XML string which is comprised of multiple attributes. For example, if group data 22 comprises "Admin", the example illustrated in FIG. 2 may require XML parsing logic 28 to return its resource items in the following format:

```
<Response>
    <ResourceTreeItem ID="002" Label="Open..." Description="Open
an existing document" ShortCutKeys="CTRL+O"/>
    <ResourceTreeItem ID="006" Label="Exit" Description="Exit
    document"/>
    <ResourceTreeItem ID="010" Label="Help Topics">
    <ResourceTreeItem ID="011" Label="About PIPResourceTree">
</Response>
```

Figure 3:
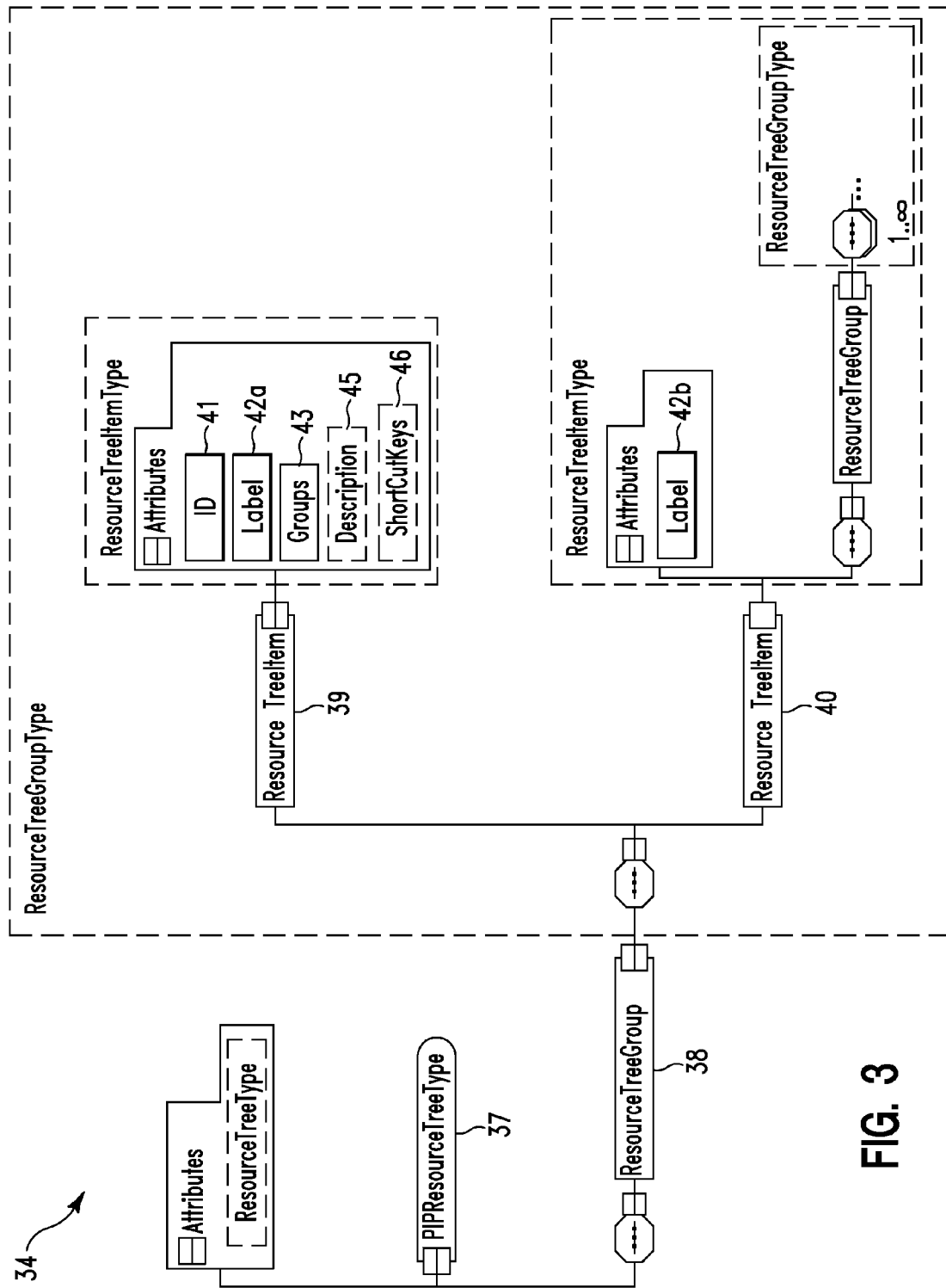
FIG. 3 illustrates a graphical representation of an XML schema, in accordance with embodiments of the present invention

FIG. 3 illustrates a graphical representation of XML schema 34, in accordance with embodiments of the present invention. An XML schema document (XSD) is defined herein as a definition file used to determine whether XML data (e.g., XML data 32 of FIG. 2) is valid. An XML file that is "well formed" indicates: that all nodes have opening and closing tags, that all attributes are properly defined, etc. A valid XML document is one that conforms to a data definition of an XSD. Each element within the XML must be defined in the schema, otherwise, the XML document is considered invalid.

XML schema 34 comprises four element types:

1. PIPResourceTreeType 37.

2. ResourceTreeGroupType 38.

3. ResourceTreeItemType 39.

4. ResourceTreeItemTType 40.

PIPResourceTreeType 37 comprises a sequence of ResourceTreeGroup nodes. PIPResourceTreeType 37 additionally comprises an optional ResourceTreeType attribute which may indicate the resource type that for this instance of XML data. For example, the ResourceTreeType attribute value could be "Application Menu". ResourceTreeGroupType 38 nodes comprises any number of ResourceTreeItemType 39 and ResourceTreeItemTType 40 nodes. ResourceTreeItemType 39 nodes comprise three mandatory attributes: ID attribute 41, label attribute 42*a*, and groups attribute 43. Additionally, ResourceTreeItemType 39 nodes may comprise two optional attributes: description attribute 45 and ShortCutKeys attribute 46. ID attribute 41 indicates a unique value that uniquely identities the resource item represented by ResourceTreeItemType 37 node. Label attribute 42*a* identifies the resource item and is typically used for display, such as the label for a corresponding menu item. Groups attribute 43 is a list groups that have been granted permission to access the resource item. XML parsing logic 28 scans this list to find matching input group data. Description attribute 45 comprises a textual description of this resource item and may also be used in a graphical user interface to further describe the resource item to the user. ShortCutKeys attribute 46 comprises the key combinations that a requesting application would assign to this resource item. For example, if a ResourceTreeType is "Application Menu", ShortCutKeys attribute 46 value for the "Copy" menu item could be "CTRL+C". ResourceTreeItemTType 40 nodes comprises a label attribute 42*a* as well as a sequence of ResourceTreeGroupType 38 nodes. A ResourceTreeItemTType 40 node is a transitional node. No access permissions are necessary (i.e., there is no "Groups" attribute associated with a ResourceTreeGroupType 40 node). A ResourceTreeItemTType 40 node is used to transition from a parent node to a child node(s). For example, in FIG. 2 the label attribute values for the transition nodes required to navigate to the "Other . . . " resource item include: "File", "Send To" and "Bluetooth".

The following XML schema illustrates a text version of XML schema 34: PIP XML

```
<?xml version="1.0" encoding="UTF-8" standalone="yes"?>
<xs:schema xmlns:xs="http://www.w3.org/2001/XMLSchema"
xmlns="http://patents.lex.company.com/pipresourcetree"
targetNamespace="http://patents.lex.company.com/pipresourcetree"
elementFormDefault="qualified" attributeFormDefault="unqualified">
    <xs:annotation>
        <xs:documentation xml:lang="en">
        Efficient access control schema.
        Copyright 2007 company
        All rights reserved.
        </xs:documentation>
    </xs:annotation>
    <xs:element name="PIPResourceTree" type="PIPResourceTreeType"/>
    <xs:annotation>
        <xs:documentation xml:lang="en">
        A hierarchial, application-specific resource structure consisting of
        resource items.
        </xs:documentation>
    </xs:annotation>
    <xs:complexType name="PIPResourceTreeType">
        <xs:sequence>
            <xs:element name="ResourceTreeGroup"
type="ResourceTreeGroupType"/>
        </xs:sequence>
        <xs:attribute name="ResourceTreeType" type="xs:string" use="optional"/>
    </xs:complexType>
    <xs:complexType name="ResourceTreeGroupType">
        <xs:choice maxOccurs="unbounded">
            <xs:element name="ResourceTreeItem" type="ResourceTreeItemType"/>
            <xs:element name="ResourceTreeItemT"
type="ResourceTreeItemTType"/>
        </xs:choice>
    </xs:complexType>
    <xs:complexType name="ResourceTreeItemType">
        <xs:annotation>
            <xs:documentation xml:lang="en">
            A resource item is the last child node in a branch of a resource tree.
            This child node must have an identifier, a label to be displayed, a
                description, as well as entitlement groups (comprised of comma-separated
                group names). A resource item access privilege can be associated with
                each resource item.
            </xs:documentation>
        </xs:annotation>
        <xs:attribute name="ID" type="xs:string" use="required"/>
        <xs:attribute name="Label" type="xs:string" use="required"/>
```

```
        <xs:attribute name="Groups" type="xs:string" use="required"/>
        <xs:attribute name="Description" type="xs:string" use="optional"/>
        <xs:attribute name="ShortCutKeys" type="xs:string" use="optional"/>
    </xs:complexType>
    <xs:complexType name="ResourceTreeItemTType">
        <xs:annotation>
            <xs:documentation xml:lang="en">
      This is a virtual resource item used for traversing to a terminating
         resource item. No entitlements are associated with a virtual resource
         item.
        </xs:documentation>
        </xs:annotation>
        <xs:sequence>
            <xs:element name="ResourceTreeGroup"
type="ResourceTreeGroupType"/>
        </xs:sequence>
        <xs:attribute name="Label" type="xs:string" use="required"/>
    </xs:complexType>
</xs:schema>
```

Figure 4:
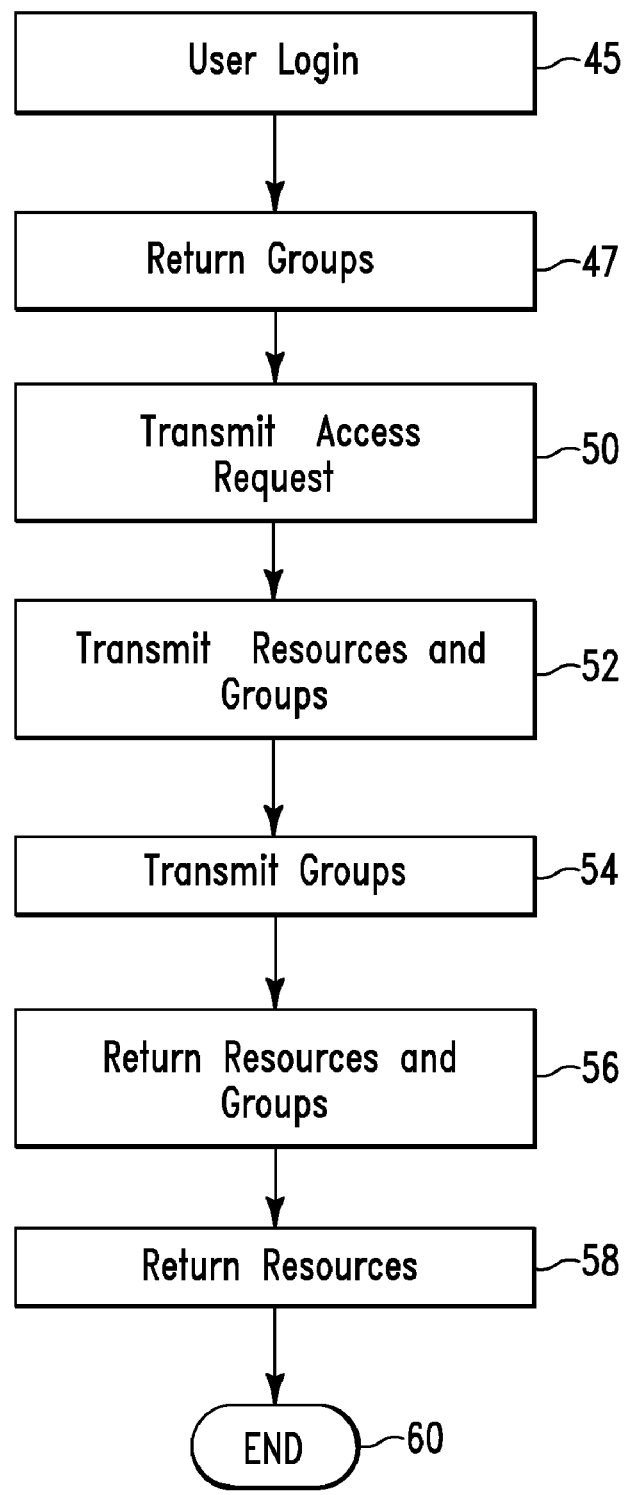
FIG. 4 illustrates a flowchart describing an algorithm used by the system of FIG. 1 for implementing the access control decision process used by the system of FIG. 1, in accordance with embodiments of the present invention.

FIG. 4 illustrates a flowchart describing an algorithm used by system 2 of FIG. 1 for implementing the access control decision process used by system 2 of FIG. 1, in accordance with embodiments of the present invention. In step 45 a user login is transmitted to an authentication system (i.e., a software component in computing system 10 of FIG. 1). The user (e.g., a software component) must first login to the authentication system. The user must present whatever credentials are required by the authentication System in order to prove that it is a legitimate user of the system. In step 47, (i.e., upon successful login), the authentication system returns the group(s) data to which the user belongs to. In step 50, the user submits an access request for resource(s) along with its group(s) to a policy enforcement point system (i.e., a software component in computing system 10 of FIG. 1). The access request may be a request for the user's complete list of application menu items. In step 52, a policy decision point system (i.e., a software component in computing system 10 of FIG. 1) sends the resource to which the user requests access and the user's group(s) data to policy information point (PIP) software application 18. In step 54, the policy decision point system from step 52, holds onto the requested resource and transmits the group(s) data to policy information point (PIP) software application 18. In step 56, (i.e., when policy information point (PIP) software application 18 receives a list of group(s)), policy information point (PIP) software application 18 parses XML data in order to return the matching resource. Note that industry standard XML parsing libraries may be leveraged by policy information point (PIP) software application 18 to efficiently parse the XML data. In step 58, policy information point (PIP) software application 18 returns the list of resource(s) that the user is entitled to in order to access the policy decision point system from step 52. The policy decision point system may process the list of resources as designed. For example, the policy decision point system may populate an application's menu structure based on the list of returned resources and make that menu accessible to the user.

Figure 5:
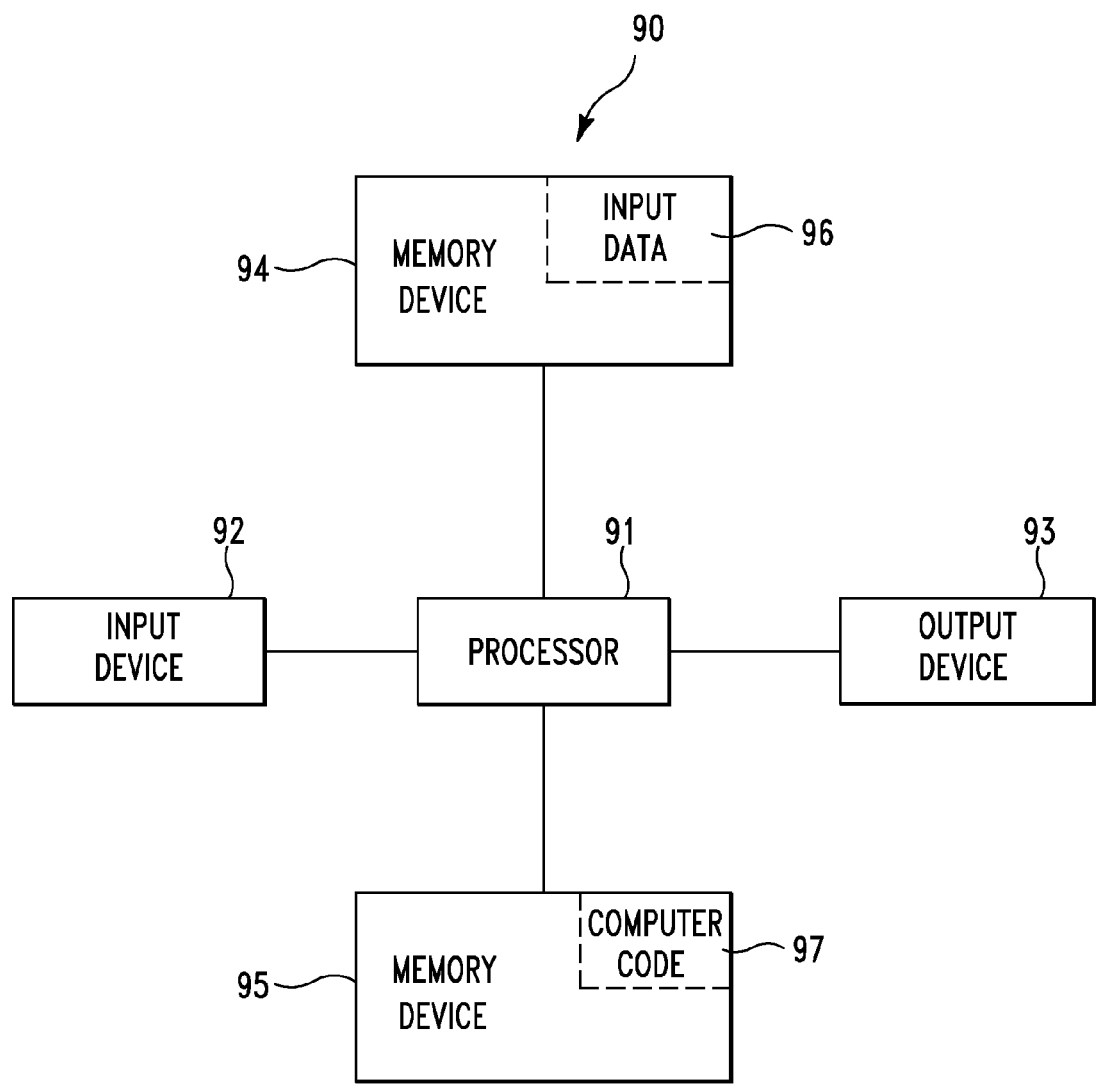
FIG. 5 illustrates a computer apparatus used for performing a process for accessing computing resource data, in accordance with embodiments of the present invention.

FIG. 5 illustrates a computer apparatus 90 (e.g., computing system 10 of FIG. 1) used for performing a process for accessing computing resource data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for performing a process for accessing computing resource data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to perform a process for accessing computing resource data. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for performing a process for accessing computing resource data. In another embodiment, the invention provides a business method that performs the process steps of the invention on a subscription, advertising, and/or fee basis. That is, a service provider, such as a Solution Integrator, could offer to perform a process for accessing computing resource data. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A selection method comprising:
providing, by a computing system for a requestor, access to said computing system, wherein said computing system comprises a memory system, wherein said memory system comprises group based access control data and computing resource data, wherein said group based access control data and said computing resource data are organized based on an extensible markup language (XML) schema, and wherein said XML schema comprises a recursive format used to support a plurality of branch levels in a resource tree;
associating, by said computing system in response to said enabling, first group data of said group based access control data with said requestor;
receiving, by said computing system from said requestor, a first request for accessing said computing resource data;
associating, by said computing system in response to said first request, said first group data with a first group of computing resources of said computing resource data;
generating, by said computing system, a first list comprising attribute values for said first group of computing resources, wherein said attribute values are associated with an XML string that conforms to said XML schema; and
presenting, by said computing system to said requestor, said first list.

2. The method of claim 1, wherein said computing resource data is organized using a hierarchal ranking format.

3. The method of claim 1, wherein said first request for accessing said computing resource data comprises a request for retrieving a list of application resource items.

4. The method of claim 1, further comprising:
storing, by said computing system, said first list.

5. The method of claim 1, wherein said requestor comprises an entity selected from the group consisting of a person and a software application.

6. The method of claim 1, wherein said XML schema defines leaf nodes comprising attributes defined by said attribute values, and wherein said attributes comprise a mandatory ID attribute and a mandatory label attribute.

7. The method of claim 6, wherein said attribute values define an optional description attribute and an optional ShortCutKeys attribute.

8. The method of claim 1, wherein said computing system comprises parsing logic, wherein said XML schema defines leaf nodes comprising first attributes defined by said attribute values, wherein said parsing logic performs said associating said first group data with said first group of computing resources, and wherein said first attributes comprise attributes selected from the group consisting of an ID attribute, a label attribute, a description attribute, and a ShortCutKeys attribute.

9. A computing system comprising a processor coupled to a computer-readable memory unit, said memory unit comprising instructions that when executed by the processor implements a selection method, said method comprising:
providing, by said computing system for a requestor, access to said computing system, wherein said memory unit comprises group based access control data and computing resource data, wherein said group based access control data and said computing resource data are organized based on an extensible markup language (XML) schema, and wherein said XML schema comprises a recursive format used to support a plurality of branch levels in a resource tree;
associating, by said computing system in response to said enabling, first group data of said group based access control data with said requestor;
receiving, by said computing system from said requestor, a first request for accessing said computing resource data;
associating, by said computing system in response to said first request, said first group data with a first group of computing resources of said computing resource data;
generating, by said computing system, a first list comprising attribute values for said first group of computing resources, wherein said attribute values are associated with an XML string that conforms to said XML schema; and
presenting, by said computing system to said requestor, said first list.

10. The computing system of claim 9, wherein said computing resource data is organized using a hierarchal ranking format.

11. The computing system of claim 9, wherein said first request for accessing said computing resource data comprises a request for retrieving a list of application resource items.

12. The computing system of claim 9, wherein said method further comprises:
storing, by said computing system, said first list.

13. The computing system of claim 9, wherein said requestor comprises an entity selected from the group consisting of a person and a software application.

14. The computing system of claim 9, wherein said XML schema defines leaf nodes comprising attributes defined by said attribute values, and wherein said attributes comprise a mandatory ID attribute and a mandatory label attribute.

15. The computing system of claim 14, wherein said attribute values define an optional description attribute and an optional ShortCutKeys attribute.

16. The computing system of claim 9, wherein said computing system comprises parsing logic, wherein said XML schema defines leaf nodes comprising first attributes defined by said attribute values, wherein said parsing logic performs said associating said first group data with said first group of computing resources, and wherein said first attributes comprise attributes selected from the group consisting of an ID attribute, a label attribute, a description attribute, and a ShortCutKeys attribute.

17. A computer program product, comprising a computer readable medium comprising a computer readable program code embodied therein, said computer readable program code adapted to implement a selection method within a computing system comprising a computer-readable memory unit, said method comprising:
providing, by said computing system for a requestor, access to said computing system, wherein said memory unit comprises group based access control data and computing resource data, wherein said group based access control data and said computing resource data are organized based on an extensible markup language (XML) schema, and wherein said XML schema comprises a recursive format used to support a plurality of branch levels in a resource tree;

associating, by said computing system in response to said enabling, first group data of said group based access control data with said requestor;

receiving, by said computing system from said requestor, a first request for accessing said computing resource data;

associating, by said computing system in response to said first request, said first group data with a first group of computing resources of said computing resource data;

generating, by said computing system, a first list comprising attribute values for said first group of computing resources, wherein said attribute values are associated with an XML string that conforms to said XML schema; and presenting, by said computing system to said requestor, said first list.

18. The computer program product of claim 17, wherein said first request for accessing said computing resource data comprises a request for retrieving a list of application resource items.

19. The computer program product of claim 17, wherein said XML schema defines leaf nodes comprising attributes defined by said attribute values, and wherein said attributes comprise a mandatory ID attribute and a mandatory label attribute.

20. The method of claim 1, further comprising:

providing at least one support service for at least one of creating, integrating, hosting, maintaining, and deploying computer-readable code in said computing system, wherein the code in combination with the computing system is capable of performing said enabling, said associating said first group data with said requestor, said receiving, said associating said first group data with said first group of computing resources, said generating, and said presenting.

* * * * *